(12) United States Patent
Kim et al.

(10) Patent No.: US 8,343,888 B2
(45) Date of Patent: Jan. 1, 2013

(54) WASHCOATING TECHNIQUE FOR PEROVSKITE CATALYSTS

(75) Inventors: Chang H Kim, Rochester, MI (US); Wei Li, Troy, MI (US); Kevin A Dahlberg, Saline, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 412 days.

(21) Appl. No.: 12/571,606

(22) Filed: Oct. 1, 2009

(65) Prior Publication Data
US 2011/0082030 A1 Apr. 7, 2011

(51) Int. Cl.
*B01J 23/00* (2006.01)
*B01J 21/00* (2006.01)
*B01J 29/00* (2006.01)
*B01J 37/00* (2006.01)

(52) U.S. Cl. ........ 502/303; 502/104; 502/110; 502/111; 502/113; 502/117; 502/240; 502/241; 502/252; 502/258; 502/259; 502/260; 502/261; 502/262; 502/263; 502/302; 502/304; 502/314; 502/316; 502/317; 502/324; 502/326; 502/327; 502/328; 502/330; 502/332; 502/333; 502/334; 502/335; 502/336; 502/337; 502/338; 502/339; 502/355; 502/415; 502/439; 502/525

(58) Field of Classification Search .............. 502/104, 502/110, 111, 113, 117, 240, 241, 252, 258–263, 502/302–304, 314, 316, 317, 324, 326–328, 502/330, 332–339, 355, 415, 439, 525
See application file for complete search history.

(56) References Cited

U.S. PATENT DOCUMENTS

| | | | | |
|---|---|---|---|---|
| 5,622,680 A * | 4/1997 | Monceaux et al. | ........ | 423/213.5 |
| 6,352,955 B1 * | 3/2002 | Golden | .......... | 502/302 |
| 6,372,686 B1 * | 4/2002 | Golden | .......... | 502/302 |
| 6,531,425 B2 * | 3/2003 | Golden | .......... | 502/302 |
| 6,534,670 B2 * | 3/2003 | Yoshisato | ...... | 502/302 |
| 6,720,443 B2 * | 4/2004 | Yoshisato | ...... | 558/274 |
| 7,014,825 B2 * | 3/2006 | Golden | ....... | 423/213.2 |
| 7,071,141 B2 * | 7/2006 | Gandhi et al. | ........ | 502/302 |
| 7,205,257 B2 * | 4/2007 | Tanaka et al. | ......... | 502/327 |
| 7,381,394 B2 * | 6/2008 | Tanaka et al. | ......... | 423/593.1 |
| 7,514,055 B2 * | 4/2009 | Golden | ....... | 423/213.2 |
| 7,576,032 B2 * | 8/2009 | Tanaka et al. | ......... | 502/340 |
| 7,601,325 B2 * | 10/2009 | Tanaka et al. | ......... | 423/593.1 |

(Continued)

OTHER PUBLICATIONS

E. Arendt et al.; Structuration of LaMnO3 perovskite catalysts on ceramic and metallic monoliths: Physico-chemical characterisation and catalytic activity in methane combustion; Elsevier; accepted Jan. 7, 2008, available online Feb. 1, 2008; Applied Catalysis A: General 339 (2008); pp. 1-14.

*Primary Examiner* — Cam N. Nguyen
(74) *Attorney, Agent, or Firm* — Reising Ethington P.C.

(57) ABSTRACT

Precursor cations of A and B elements of an $ABO_3$ perovskite in aqueous solution are formed as an ionic complex gel with citric acid or other suitable polybasic carboxylic acid. The aqueous gel is coated onto a desired catalyst substrate and calcined to form, in-situ, particles of the crystalline perovskite as, for example, an oxidation catalyst on the substrate. In one embodiment, a perovskite catalyst such as $LaCoO_3$ is formed on catalyst supporting cell walls of an extruded ceramic monolith for oxidation of NO in the exhaust gas of a lean burn vehicle engine.

20 Claims, 3 Drawing Sheets

U.S. PATENT DOCUMENTS

| | | | |
|---|---|---|---|
| 7,622,418 B2 * | 11/2009 | Tanaka et al. | 502/325 |
| 7,718,562 B2 * | 5/2010 | Gandhi et al. | 502/66 |
| 7,955,529 B2 * | 6/2011 | Wu et al. | 252/519.13 |
| 7,964,167 B2 * | 6/2011 | Kim et al. | 423/213.2 |
| 8,007,691 B2 * | 8/2011 | Sawaki et al. | 252/514 |
| 2002/0179887 A1 * | 12/2002 | Zeng et al. | 252/373 |
| 2003/0105346 A1 * | 6/2003 | Yoshisato | 558/270 |
| 2004/0191150 A1 * | 9/2004 | Yano et al. | 423/263 |
| 2004/0247511 A1 * | 12/2004 | Mafune et al. | 423/263 |
| 2005/0164890 A1 * | 7/2005 | Zeng et al. | 505/474 |
| 2005/0233897 A1 * | 10/2005 | Tanaka et al. | 502/302 |
| 2005/0249653 A1 * | 11/2005 | Tanaka et al. | 423/263 |
| 2008/0044344 A1 * | 2/2008 | Shikida et al. | 423/598 |
| 2008/0260624 A1 * | 10/2008 | Ikeda et al. | 423/598 |
| 2009/0023580 A1 * | 1/2009 | Tanaka et al. | 502/171 |
| 2009/0131252 A1 * | 5/2009 | Tanaka et al. | 502/304 |
| 2009/0324468 A1 * | 12/2009 | Golden et al. | 423/210 |
| 2010/0086458 A1 * | 4/2010 | Kim et al. | 423/239.1 |
| 2010/0140569 A1 * | 6/2010 | Wu et al. | 252/519.13 |
| 2010/0151362 A1 * | 6/2010 | Sawaki et al. | 429/523 |

* cited by examiner

WASHCOATING TECHNIQUE FOR PEROVSKITE CATALYSTS

TECHNICAL FIELD

This invention pertains to the formation and concomitant application of perovskite catalyst compositions onto a substrate suitable for use in a catalyzed reaction. More specifically, this invention pertains to a method for forming and coating such catalyst compositions on a catalyst support structure such as for oxidation of constituents of vehicle engine exhaust.

BACKGROUND OF THE INVENTION

Diesel engines, some gasoline fueled engines, and many hydrocarbon fueled power plants are operated at higher than stoichiometric air to fuel mass ratios for improved fuel economy. Such lean-burning engines and other power sources, however, produce a hot exhaust with a relatively high content of oxygen and nitrogen oxides (collectively, $NO_x$). In the case of diesel engines, the temperature of the exhaust from a warmed up engine is typically in the range of 200 degrees to 400 degrees Celsius, and has a typical composition, by volume, of about 10% oxygen, 1.6% carbon dioxide, 0.1% carbon monoxide, 180 ppm hydrocarbons, 235 ppm $NO_x$ and the balance nitrogen and water. The $NO_x$ gases, typically comprising nitric oxide (NO) and nitrogen dioxide ($NO_2$), are difficult to reduce to nitrogen ($N_2$) because of the high oxygen ($O_2$) content in the hot exhaust stream.

Reduction of $NO_x$ constituents in the exhaust of lean-operating engines remains a problem in the implementation of high fuel efficiency lean-burn engines. Two different approaches are promising: (a) $NO_x$ storage from the exhaust stream and reduction to nitrogen and (b) ammonia addition to the exhaust enabling selective catalytic reduction. The efficiency of NOx removal in both practices is significantly enhanced by an increased proportion of $NO_2$ in the total $NO_x$. Since engine-out $NO_x$ typically includes less than 10% $NO_2$, NO oxidation performance of the oxidation catalysts is important for the overall treatment of NOx emissions. Currently precious metal-based catalysts are most commonly used for NOx oxidation for diesel application. But these platinum-group catalysts suffer from high material cost and insufficient durability.

Perovskites are a broad class of compounds of the general composition $ABX_3$, where 'A' and 'B' are two complementary cations of very different sizes, and X is an anion that bonds to both. Some perovskite compositions such as $LaCoO_3$ are known for oxidation activity with respect to volatile organic compounds. It is an object of this invention to adapt suitable perovskite materials as oxidation catalysts, such as for the treatment of lean burn engine vehicle exhausts.

Platinum-group metals, dispersed on high surface area alumina support particles, have been applied as coatings (called "washcoats") on surfaces of cordierite or silicon carbide support bodies for catalytic treatment of automotive vehicle exhaust streams. Preferred current practice is to use a honeycomb-like, flow-through, extruded cordierite support with up to 400 parallel, open-ended gas channels per square inch and an open frontal area of about 71%. The extruded cordierite body may have a circular or oval cross-section with a suitable length for the intended reaction, and is inserted in the exhaust stream so that the hot gas flows through the channels and is affected as intended by the noble metal/alumina catalyst particle-bearing surfaces.

It is a further object of this invention to provide a practice for forming and simultaneously applying effective particulate coatings of perovskite catalyst materials (e.g., oxidation catalyst) on support bodies for exhaust gas treatment. This object includes (but is not limited to) forming in-situ and applying particles of a perovskite catalyst material on the small longitudinal wall surfaces of the cells of an exhaust gas flow-through ceramic support body.

SUMMARY OF THE INVENTION

This invention provides a method of bringing together the constituent atoms (ions) of a desired perovskite compound with the precursor ions dispersed in a water-based gel of fluidity suitable for coating on a surface of catalyst support. The support body may, for example, be an extruded and fired cordierite honeycomb for exhaust gas treatment and with many open-ended thin-wall cells aligned with the extrusion axis. In this embodiment, the perovskite precursor gel contains enough water to flow into the hundreds of small cell openings and disperse the gel as a coating on each of the cell wall surfaces of the ceramic body.

A practice of the invention may be illustrated in the preparation of a representative perovskite composition, $LaCoO_3$, as a catalyst for the oxidation of NO to $NO_2$ in the exhaust of a lean-burn hydrocarbon-fueled engine. In this illustrative (but not limiting) example, an aqueous solution of substantially equal molar quantities of acid salts of lanthanum and cobalt is prepared. Suitably, the acid salts contain oxygen. Nitrate salts are convenient to use because of their availability, low cost and water solubility. For example, equi-molar amounts of the hydrated salts $La(NO_3)_3 \cdot 6H_2O$ and $Co(NO_3)_2 \cdot 6H_2O$ may be used in preparing the aqueous solution. Obviously, the lanthanum and cobalt are to serve as the cations of the perovskite and oxygen as the anions in the crystal structure.

A water soluble, multi-basic acid, such as citric acid is added to the solution of the precursors to form complex gatherings or clusters of the respective ions in the solution. For example, the tri-basic citric acid is seen as reacting with the metal ions in the solution and accommodating them in a complex of gathered ions for application of the complex on a desired supporting substrate for the ultimate catalyst. The aqueous solution is stirred and heated (for example to about 80° C.) to obtain complexation of the metal ions. At this point the aqueous solution/gel may require adjustment of its fluidity for suitable coating on an intended catalyst substrate. For example, the aqueous gel may be more fluid or of a thinner consistency than desired for coating onto an extruded monolithic catalyst support surface. In this embodiment, water may be evaporated to obtain a more effective coating medium for the target surface(s). In a preferred embodiment of this invention the precursor material is to be applied to the many cell walls of an extruded cordierite honey comb body (e.g., 400 channels per square inch of the open ends). In this embodiment, a suitable aqueous gel may comprise about a liter of volume for each half-gram mole of desired perovskite product ($ABO_3$). In other words, the water content of the aqueous ionic complex may be adjusted, if necessary, such that the concentrations of each of the A-group ions and B-group ions are in the range of about 0.45 to about 0.65 gram mole per liter of volume of the aqueous ionic complex (the gel).

Ceramic monolith bodies may then be immersed, preferably vertically (with cell openings down), to wet and coat the cell walls with the gel of perovskite precursor material. After a brief immersion the monolith is removed from the solution. The many cells then contain a thin adherent coating of the gel material and overlying mobile excess material. An air stream may be used to blow the un-absorbed gel material from the cell walls. The wet substrate may be set horizontally in an oven and heated and air dried. The coated substrate is then calcined in flowing air to form fine crystals of the perovskite catalyst ($LaCoO_3$ in this illustration) on the cell walls of the cordierite substrate. Repeated coatings with the precursor material and repeated calcining may be practiced until a layer of perovskite catalyst of desired thickness or amount is formed on the cell walls.

In the above illustration, lanthanum is the A cationic constituent and cobalt the B constituent of an $ABO_3$ perovskite composition selected as an oxidation catalyst for vehicle exhaust gas remediation. Obviously, one or more other relatively large cations may be used as the A constituent. And one or more other smaller cations may be used as the B constituent. In general, the total number of ions of the A constituent(s) should be substantially equal to the number of ions of the B constituent(s). And sufficient oxygen is provided to form the desired perovskite crystal structure. The relative sizes of the A and B constituents complement each other in forming the crystalline material that is formed, in accordance with this invention, directly on a catalyst support surface.

Thus, in accordance with practices of this invention the intended perovskite catalyst material is formed in-situ on the intended catalyst support material. And, as will be demonstrated below, the catalyst material formed in accordance with practices of this invention is a very effective catalyst for the oxidation of nitric oxide to nitrogen dioxide.

Moreover, in addition to being a simpler perovskite preparing and coating process, this invention conveys other benefits. Specifically: a greater substrate loading is achieved with each application of the gel washcoat; a constant loading of catalyst occurs on every application of the gel washcoat; and the catalytic performance is significantly improved.

Other objects and advantages of the invention will be understood from a further discussion of certain illustrative detailed embodiments of the practice of the invention.

DESCRIPTION OF PREFERRED EMBODIMENTS

Figure 1:
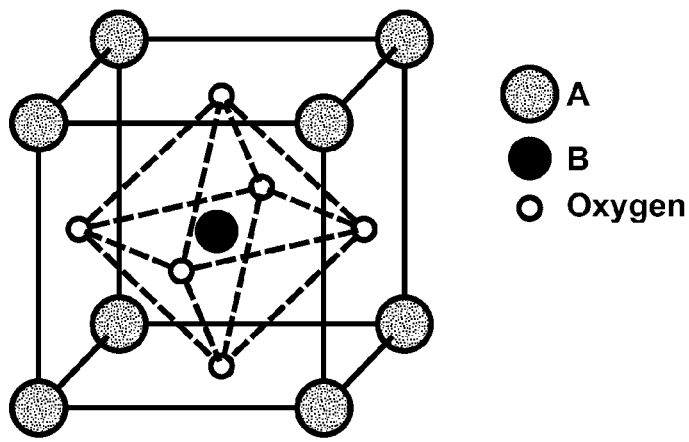
FIG. 1 is a representation of the perovskite crystal structure. The cubic crystal structure shows eight "A" ions (e.g., $La^{+3}$ ions) each shared by eight adjacent cells, a single body-centered "B" ion (e.g., a $Co^{+3}$ ion) and six face centered oxygen ions ($O^{-2}$).

The term perovskites refers to a class of compounds possessing a specific crystal structure, shown in FIG. 1, of general formula $ABX_3$, where 'A' and 'B' are two cations of very different sizes, and 'X' is an anion that bonds to both. In many perovskites for use in practices of this invention, oxygen is the anion. A wide range of cations may be employed, with larger cations such as La, Sr, Y and Ca occupying a specific site with dodecahedral coordination, here designated the 'A' site, while smaller cations such as Cr, Ti, Mn, Ni, Co, Fe and Mg occupy alternate sites with 6-fold coordination, surrounded by an octahedron of anions, here designated the 'B' site.

Perovskites may be fabricated in several ways, but one favored approach has been to form an aqueous of the nitrates of 'A' and 'B' cations (or hydrated nitrates) with the ratio of 'A':'B' being 1:1. For best results it is desired to regulate the concentration of the solution by adding a volume of water in proportion to the mass to the 'A' ion nitrate. A polybasic acid such as citric acid is then added at least in an amount equal to one equivalent of citric acid per equivalent of metal ions, or more preferably in 10% by weight excess.

From the foregoing it should not be assumed that 'A' and 'B' atoms are uniquely associated with specific chemical species. It is well known that ionic substitution of 'a' ions for 'A' ions and of 'b' ions for 'B' ions may occur in the perovskite structure leading to supercell structures based on 'fractional' compositions $A_{1-x}a_xB_{1-y}b_yO_3$, such as $La_xSr_{1-x}Cr_yMn_{1-y}O_3$. Such 'fractional' compositions involving multiple chemical species, and not restricted to any specific number of chemical species, are comprehended by this invention. For convenience only, the details of the invention are described with reference to 'A' ions and 'B' ions.

After the reaction has gone to completion, evaporation of the water will result in the formation of a gel. In accordance with prior art perovskite preparation and coating practices, the gel is further heated until it combusts in air at about 300° C. On further exposure to still elevated temperatures of about 700° C. for a period of at least several hours, crystalline perovskites will result. Although alternate processes based on oxalates or acetates may be employed, the citrate approach is attractive because it yields perovskites with larger surface areas than many other approaches. Hence the catalytic activity of citrate-based perovskites is generally superior to that of perovskites produced through other reaction paths.

Figure 2:
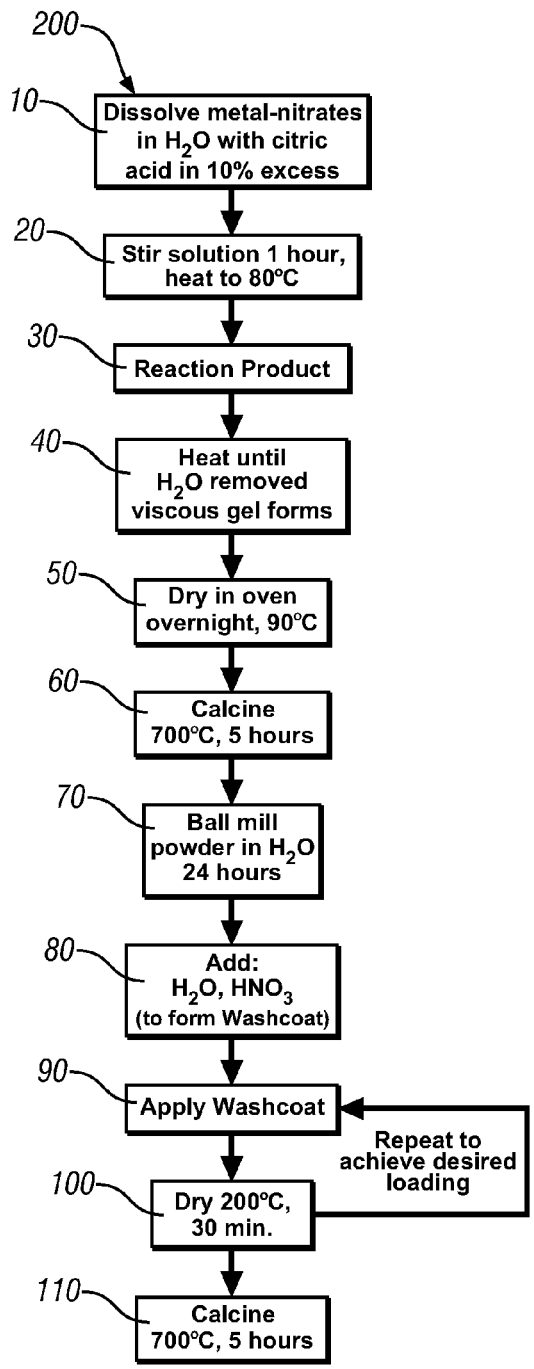
FIG. 2 shows a flow diagram summarizing the prior art method of preparing perovskite catalysts.

The prior art approach to applying perovskite to a catalyst substrate is illustrated in flowchart 200 in FIG. 2. At step 10 the reaction between the citric acid and the nitrates is initiated and brought to completion on heating to 80° C. for one hour at step 20, leading to a reaction product at step 30. The metal nitrates in aqueous solution at step 10 will comprise nitrates of both 'A' and 'B' ions in substantially 1:1 ratio.

On complete removal of water, step 40, a viscous gel forms and after further drying at 90° C. overnight, step 50, it is calcined at 700° C. for 5 hours as indicated at step 60, calcining being conducted under an air flow of 100 sccm. The perovskite is then ball milled in the presence of water for 24 hours, before being dispersed in an acidified aqueous solution to form a washcoat, steps 70 and 80.

This prior art practice has enabled confirmation of the actual formation of a desired perovskite composition and comminution of the solid material to a desired particle size for coating onto a substrate.

Still referring to FIG. 2, the washcoat is then applied, step 90, typically by repeated dipping the catalyst substrate in the slurry with intermediate drying, by holding at 200° C. for 30 minutes, step 100. Finally when a suitable catalyst loading is achieved the catalyst substrate and its perovskite coating are calcined for 5 hours at 700° C., again under an air flow of 100 sccm as indicated at step 110.

However, in this prior art method, the catalytic activity of the perovskite on the catalyst support is decreased relative to the catalytic activity of the perovskite as first formed at step 60. While such theory is not relied upon, it is speculated that some of the porosity inherent in the as-formed perovskite is rendered ineffective by the washcoating process with consequent reduction in catalytic activity. For example, the addition of $HNO_3$ at step 80 to promote adhesion of the washcoat may detrimentally affect catalytic performance. Thus it is desired to develop alternate, simpler approaches to applying the perovskite to the catalyst support which maintain its high, as-formed, catalytic activity.

Figure 3:
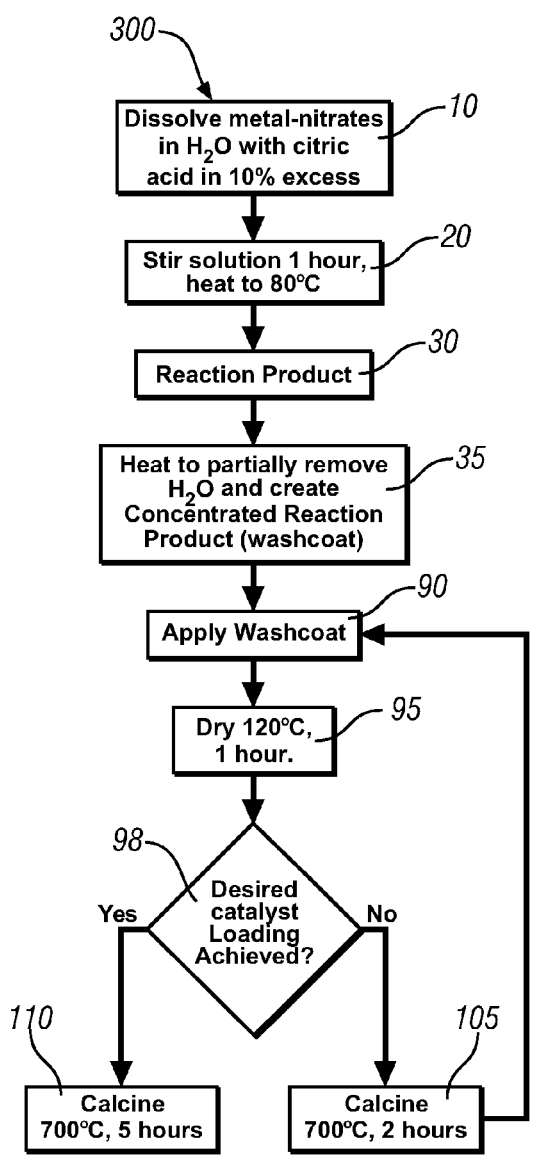
FIG. 3 shows a flow diagram summarizing the preparation of perovskite catalysts by practice of this invention.

Practice of this invention, illustrated in the flow diagram of FIG. 3 is an improved approach to wash coating catalyst substrates for fabrication of perovskite catalysts. This invention also exploits the beneficial attributes of the citrate process, and steps 10, 20 and 30 parallel those of the prior art with 'A' and 'B' ion nitrates again present in substantially 1:1 ratio. At step 35 however the reaction product is concentrated but not reduced to a gel. The procedure for application of washcoat to the catalyst substrate, step 90 is generally similar and again the washcoat is dried, step 95, though at a lower temperature and for a longer time than the prior art process. At step 105 however, the washcoated substrate is subjected to a short term calcining treatment under an air flow of 100 sccm before being cycled back to step 90 for additional washcoat application, following a determination that the desired catalyst loading has not been achieved at decision step 98. The final step, applied after determining that the desired catalyst loading has been achieved at decision step 98, is a 5 hour, 700° C. calcining treatment, step 110, again conducted under an air flow of 100 sccm.

Thus, in this invention, the washcoat is applied as a concentrated solution of the perovskite precursor and calcining is conducted in situ on the catalyst support. To apply the concentrated solution to the catalyst support, the support is immersed vertically, that is the direction in which it is introduced into the solution parallels the orientation of the channels, and held, fully immersed for 30 seconds, enabling the concentrated solution to be loaded on its walls. On removal excess solution is blown out of the channels using a flow of air. During drying the catalyst support is positioned horizontally and calcining is carried out in a flow of 100 sccm of air.

This invention thus appreciably simplifies the prior art method of depositing perovskites as catalysts. Fewer steps are required, and the need for a ball mill is eliminated.

Figure 4:
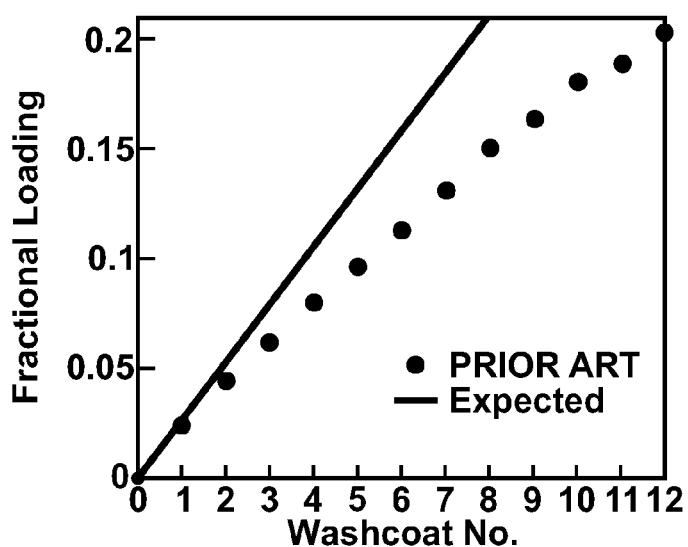
FIG. 4 shows the increase in fractional loading resulting from multiple implementation of the (prior art) slurry washcoat process.
Figure 5:
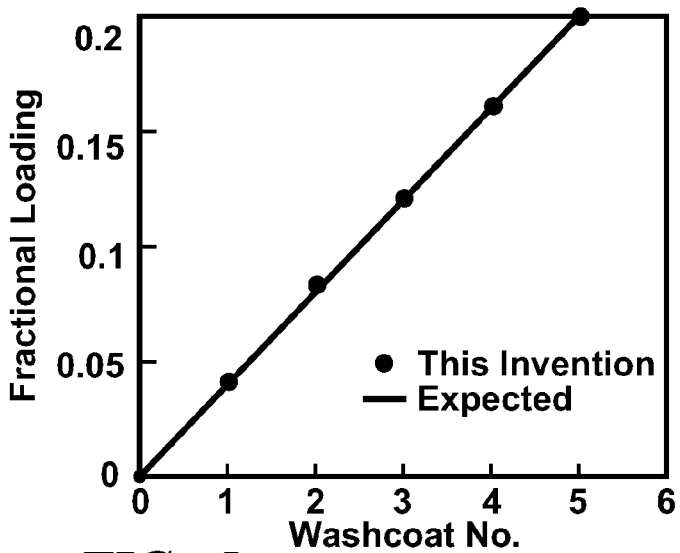
FIG. 5 shows the increase in fractional loading resulting from repeated implementations of the invented process.

This invention offers additional advantages over the prior art. Comparison of FIGS. 4 and 5 shows that this invention enables application of a desired fractional loading of catalyst with fewer washcoat applications (FIG. 5) than in the prior art (FIG. 4). In the example shown practice of the invention enables a fractional loading of 0.20 in five steps versus the 12 required by the prior art.

Further the loading per washcoat application achieved under the practice of this invention is consistent and predictable, with a fractional loading of approximately 0.04 per washcoat application. In the prior art process, the maximum fractional loading of about 0.025 per washcoat application is achieved only on the first washcoat application and decreases progressively with additional washcoat applications.

Also when the prior art technique is practiced it appears, based on the asymptotic character of FIG. 4 that there is an inherent maximum to the achievable maximum fractional loading. The linear behavior of FIG. 5 suggests no such inherent maximum and that greater fractional loading may be readily achieved using the invention described.

Figure 6:
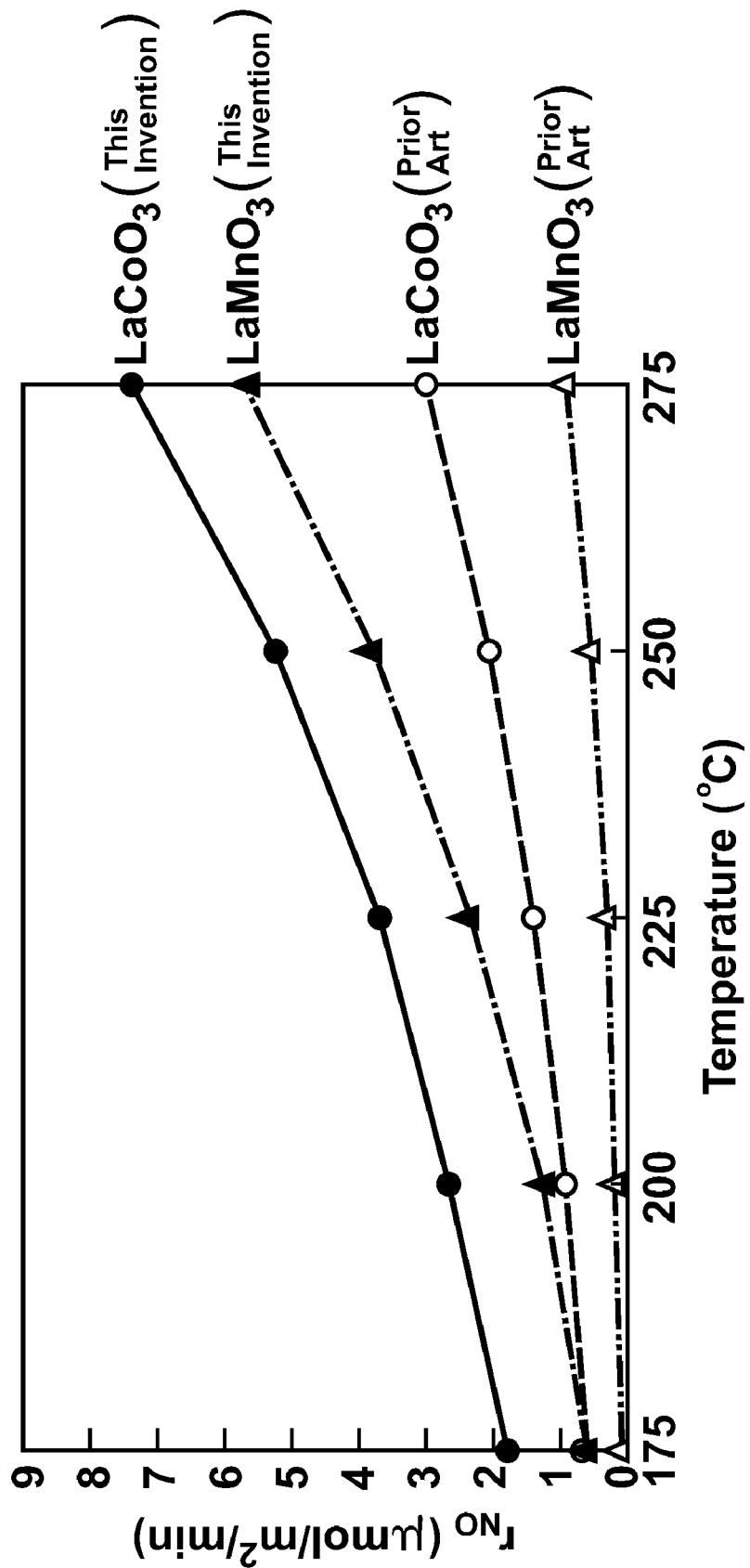
FIG. 6 compares the rate of oxidation of NO as a function of temperature for perovskite catalysts $LaCoO_3$ and $LaMnO_3$ prepared using the (prior art) slurry washcoat process and the invented process.

Significantly, perovskites deposited using the methods of the invention show greater catalytic activity those deposited using the method of the prior art. FIG. 6 shows the catalytic behavior at multiple temperatures of two specific perovskite catalytic compositions, $LaCoO_3$ and $LaMnO_3$ deposited according to the methods of this invention and according to the methods of the prior art. The marked enhancement, a greater than a factor of two improvement, in catalytic activity observable when perovskite is deposited according to the methods of the present invention is clear.

The procedure used to develop the perovskite catalyst on a cordierite catalyst summarized in FIG. 3 is described in greater detail in the following paragraphs of this specification. These examples provide specifics of the processing of the $LaCoO_3$ and $LaMnO_3$ compositions whose catalytic performance is shown in FIG. 6 and further illustrate an adaptation of the process suitable for partial substitution of A ions.

$La_{1-x}Sr_xCoO_3$ (x=0, 0.1) and $La_{1-x}Sr_xMnO_3$ (x=0, 0.1) catalysts were prepared by first dissolving appropriate amounts (see Table 1) of $La(NO_3)_3 \cdot 6H_2O$, $Co(NO_3)_2 \cdot 6H_2O$, $Mn(NO_3)_2$ and $Sr(NO_3)_2$ in distilled water with citric acid monohydrate. Citric acid was added in a 10 wt % excess to ensure complete complexation of the metal ions. The amount of water used ranged from 46.2 to 51.1 mL/g $La(NO_3)_3 \cdot 6H_2O$. Complete details on the compositions and quantities of the reactants are provided in Table 1.

TABLE 1

Examples of catalyst precursors and citric acid for perovskites synthesis

|  | $LaCoO_3$ | $La_{0.9}Sr_{0.1}CoO_3$ | $LaMnO_3$ | $La_{0.9}Sr_{0.1}MnO_3$ |
|---|---|---|---|---|
| $La(NO_3)_3 \cdot 6H_2O$ | 17.61 g | 35.62 g | 27.60 g | 36.22 g |
| $Sr(NO_3)_2$ | — | 1.93 g | — | 1.97 g |
| $Co(NO_3)_2 \cdot 6H_2O$ | 11.84 g | 26.60 g | — | — |
| $Mn(NO_3)_2$ | — | — | 14.14 g | 20.62 g |
| $C_6H_8O_7 \cdot H_2O$ | 15.67 g | 34.51 g | 24.56 g | 35.09 g |
| Deionized $H_2O$ | 825 mL | 1820 mL | 1275 mL | 1808 mL |

The reactants were heated to 80° C. while being stirred to promote a complexation reaction which produced a dilute washcoat solution. This dilute washcoat solution was then concentrated by evaporation of excess water while maintaining the temperature at 80° C. and continuing to stir the solution. On achieving the desired reaction product concentration of about 0.55 mol/L, the concentrated solution was cooled to room temperature, or about 25° C., under continued stirring. This concentrated solution was employed as the washcoat solution.

The substrate, a one inch length of 0.75 inch diameter cordierite monolith with 400 channels per inch, was submerged vertically in the washcoat solution for 30 seconds. After removal of the monolith from the washcoat solution, any excess solution was removed by blowing air through the monolith. The wet monolith was then dried in a horizontal position at 120° C. for 1 hour in air, before being calcined at 700° C. for 2 hours under an air flow of 100 sccm (Standard Cubic Centimeters per Minute). This sequence of steps was repeated until the desired loading perovskite was achieved save that the final calcination was conducted for 5 hours, again at 700° C. and under an air flow of 100 sccm.

These practices are found to be very effective in forming, in-situ, perovskite crystalline catalyst materials on catalyst support substrates.

Practices of the invention have been illustrated through reference to certain preferred embodiments that are intended to be exemplary and not limiting. The full scope of the invention is to be defined and limited only by the following claims.

The invention claimed is:

1. A method of forming crystalline particles of a perovskite catalyst material on cell wall surfaces of an extruded ceramic monolithic catalyst support substrate, wherein the perovskite crystalline particles comprise (i) cations of one or more elements, A-group cations, having a first range of ionic radii; (ii) cations of one or more elements, B-group cations, having a range of radii smaller than the first ionic radii range; and oxygen anions, and to be composed in elemental proportions as $ABO_3$, the method comprising:
    forming an aqueous solution comprising A-group cations with a substantially equivalent number of B-group cations;
    adding a polybasic, carboxyl group-containing organic acid to the aqueous solution in an amount to provide an excess of carboxyl groups with respect to the total of A-group cations and B-group cations, and reacting the carboxyl groups and cations to form an aqueous ionic complex of cations and acid;
    adjusting the water content of the aqueous ionic complex, if necessary, for coating of the aqueous ionic complex on cell wall surfaces of an extruded ceramic monolithic catalyst support;
    applying the aqueous ionic complex to cell wall surfaces of the extruded ceramic monolithic catalyst support to form an adherent coating layer of the ionic complex;
    evaporating superficial water from the coating layer; and
    calcining the coating layer in air at elevated temperature to form particles of crystalline perovskite on the cell wall surfaces of the extruded ceramic monolithic catalyst support for catalytic treatment of a as flowing through the cells of the extruded ceramic monolithic catalyst support.

2. A method as recited in claim 1 in which the water content of the aqueous ionic complex is reduced for coating of the aqueous ionic complex on the cell wall surfaces of the extruded ceramic monolithic catalyst support.

3. A method as recited in claim 1 in which the aqueous solution is formed using oxygen-containing inorganic acid salts of the A-group cations and B-group cations.

4. A method as recited in claim 1 in which the aqueous solution is formed using nitrate salts of the A-group cations and B-group cations.

5. A method as recited in claim 1 in which citric acid is added as the polybasic, carboxyl group-containing organic acid.

6. A method as recited in claim 1 in which the A-group cations comprise one or more elements selected from the group consisting of rare earth elements, alkaline earth elements, and alkali group elements.

7. A method as recited in claim 1 in which the A-group cations comprise one or more elements selected from the group consisting of lanthanum, strontium, cerium, and barium.

8. A method as recited in claim 1 in which the B-group cations comprise one or more transition elements selected from the group consisting of elements of groups 3d, 4d, and 5d of the periodic table.

9. A method as recited in claim 1 in which the B-group cations comprise one or more of cobalt, manganese and iron.

10. A method as recited in claim 1 in which the concentration of each of the A-group cations and B-group cations in the aqueous ionic complex is in the range of about 0.45 to about 0.65 gram mole per liter of the aqueous ionic complex.

11. A method of forming crystalline particles of a perovskite oxidation catalyst material on cell wall surfaces of an extruded ceramic monolithic catalyst support substrate, wherein the perovskite crystalline particles comprise (i) cations of one or more elements, A-group cations, having a first range of ionic radii; (ii) cations of one or more elements, B-group cations, having a range of radii smaller than the first ionic radii range; and oxygen anions, and to be composed in elemental proportions as $ABO_3$, the method comprising:
    (a) forming an aqueous solution of A-group cations with a substantially equivalent number of B-group cations, the solution being formed with nitrate salts of the respective cations;
    (b) adding citric acid to the aqueous solution in an amount to provide an excess of carboxyl groups with respect to the total of A-group cations and B-group cations and reacting the carboxyl groups and cations to form an ionic complex of the cations and acid;
    (c) adjusting the water content of the aqueous ionic complex, if necessary, for coating of the aqueous ionic complex on cell wall surfaces of an extruded ceramic monolithic catalyst support;
    (d) applying the aqueous ionic complex to cell wall surfaces of the extruded ceramic monolithic catalyst support to form an adherent coating layer of the ionic complex;
    (e) evaporating superficial water from the coating layer;
    (f) calcining the coating layer in air at elevated temperature to form particles of crystalline perovskite on the cell wall surfaces of the catalyst support for catalytic treatment of a as flowing through the cells of the extruded ceramic monolithic catalyst support;
    (g) determining if a desired amount of crystalline perovskite has been formed on the cell wall surfaces of the catalyst support; and, if not,
    repeating steps (d)-(f) until a desired amount has been formed.

12. A method as recited in claim 11 in which the water content of the aqueous ionic complex is reduced for coating of the aqueous ionic complex on the cell wall surfaces of the extruded ceramic monolithic catalyst support.

13. A method as recited in claim 11 in which the cell wall surfaces of the catalyst support include a plurality of open ended cells with cell walls aligned with the axis of extrusion and the aqueous ionic complex is applied to the cell walls by immersing the catalyst support in the aqueous ionic complex.

14. A method as recited in claim 11 wherein superficial water is evaporated from the coating layer by heating the catalyst support and coating layer at a temperature of about 120° C. for about one hour.

15. A method as recited in claim 11 wherein the coating layer is calcined at about 700° C.

16. A method as recited in claim 11 in which the A-group cations comprise one or more elements selected from the group consisting of rare earth elements, alkaline earth elements, and alkali group elements.

17. A method as recited in claim 11 in which the A-group cations comprise one or more elements selected from the group consisting of lanthanum, strontium, cerium, and barium.

18. A method as recited in claim 11 in which the B-group cations comprise one or more transition elements selected from the group consisting of elements of groups 3d, 4d, and 5d of the periodic table.

19. A method as recited in claim 11 in which the B-group cations comprise one or more of cobalt and manganese.

20. A method as recited in claim 11 in which the concentration of each of the A-group cations and B-group cations in the aqueous ionic complex is in the range of about 0.45 to about 0.65 gram mole per liter of the aqueous ionic complex.

* * * * *